United States Patent [19]

Schmidt

[11] Patent Number: 4,900,450
[45] Date of Patent: Feb. 13, 1990

[54] REMOVING RESIDUAL ALKALI METAL IONS FROM DEMINERALIZED WATER

[75] Inventor: Kenneth A. Schmidt, Clarendon Hills, Ill.

[73] Assignee: Culligan International Company, Northbrook, Ill.

[21] Appl. No.: 214,388

[22] Filed: Jul. 1, 1988

[51] Int. Cl.$^4$ .............................................. C02F 1/42
[52] U.S. Cl. .................................. 210/679; 210/685; 210/900
[58] Field of Search ............... 210/681, 685, 694, 283, 210/284, 290, 503, 679, 900

[56] References Cited

U.S. PATENT DOCUMENTS

| | | | |
|---|---|---|---|
| 2,726,141 | 12/1956 | Appell | 23/152 |
| 3,250,703 | 5/1966 | Levendusky | 210/777 |
| 3,420,709 | 1/1969 | Barrett et al. | 210/503 |
| 3,618,589 | 11/1971 | Tavani | 210/685 |
| 4,219,414 | 8/1980 | Crits | 210/27 |
| 4,547,291 | 10/1985 | Kunin | 210/670 |
| 4,548,717 | 10/1985 | Kunin | 210/670 |
| 4,564,455 | 1/1986 | Flynn et al. | 210/675 |
| 4,568,466 | 2/1986 | Salem et al. | 210/663 |
| 4,747,955 | 5/1988 | Kunin | 210/679 |
| 4,820,421 | 4/1989 | Auerswald | 210/685 |

OTHER PUBLICATIONS

Publication relating to the Everpure brand of filters, 3 pages.
Article of Regunathan et al., entitled Microbiological Characteristics of Point-of-Use Precoat Carbon Filters Journal AWWA, Oct., 1987, pp. 67-75.

*Primary Examiner*—Ivars Cintins
*Attorney, Agent, or Firm*—Gerstman & Ellis, Ltd.

[57] ABSTRACT

Residual alkali metal ions from water, typically water having passed through a strong base demineralizer unit, may be removed by passing the water through a weak acid cation exchange resin, having a particle size distribution in which at least 90 weight percent of the resin has a particle size of at least 15 microns and at least 90 weight percent of the resin has a particle size of no more than 150 microns.

8 Claims, 1 Drawing Sheet

REMOVING RESIDUAL ALKALI METAL IONS FROM DEMINERALIZED WATER

BACKGROUND OF THE INVENTION

Water demineralizing units, such as two-bed demineralizers, are used to remove dissolved minerals such as calcium, magnesium, sodium, sulfate, chloride, and alkalinity from water. Typically, ion exchange resins such as the strong base anion, weak base anion, and strong acid cation types are used in the demineralization of water.

As a disadvantage, strong base demineralizers normally leak a few parts per million of alkalinity, caused mostly by the presence of sodium ions which are not neutralized by the presence of strong acid anions, so that at least some of the residual sodium ions present may be considered to be in the form of sodium hydroxide.

In some industrial uses, it is desired to remove this residual alkalinity from the effluent water to obtain a product having a pH that is very close to neutral (between 6.8 and 7.2) and having an electrical resistivity on the order of one megaohm. Such a neutral pH and high resistivity cannot be achieved in the presence of traces of sodium hydroxide.

Such small amounts of alkalinity can be effectively removed by either a strong acid or weak acid ion exchange resin, both having been employed in the past for such a purpose. However, the use of such "polishing" units (for removing last traces of alkalinity in effluent water) requires added, expensive ion exchange cells having high ion exchange capacity, so that there is no need for frequent regeneration of the cells. For example, in the prior art, one might "polish" the water effluent stream from a 42 inch two-bed demineralizer flowing at 100 gallons per minute with a 30-inch to 40-inch cation polishing unit.

In accordance with this invention, an improvement is proposed in the method of "polishing" effluent water from a strong base demineralizer which carries a residual amount of alkalinity. By the improvement of this invention, the size and expense of the "polishing" unit can be significantly reduced without a significant loss of water processing capacity. Thus, large quantities of water may be demineralized by this invention to desired pH and high resistivity at reduced cost.

DESCRIPTION OF THE INVENTION

In this invention, a method is provided for removing residual alkali metal ions from water, typically water which is passed through a strong base demineralizer unit and carries a small residue of alkalinity. In accordance with the invention, one passes the water through a weak acid cation exchange resin having a particle size distribution in which at least 90 weight percent of the resin has a particle size of at least 15 microns and at least 90 weight percent of the resin has a particle size as of no more than 150 microns. By the use of such a finely divided weak acid cation exchange resin, a significant increase in the ion exchange capacity of the resin is provided, so that a smaller sized unit may be provided to the water processing system without a loss of overall ion exchange capacity. Thus, the smaller sized unit, having more finely divided cation exchange resin, may cost considerably less in capital expense, and may also be less expensive to maintain in operation due to the reduced quantity of cation exchange resin present compared with the amount of water processed.

One reason that this can be accomplished is that the water product being passed through the weak acid cation exchange resin in accordance with this invention has a very low concentration of sodium ions. Thus, a unit which carries the weak acid cation exchange resin in accordance with this invention does not have to exhibit a high *rate* of alkali metal ion removal, because there will be few alkali metal ions to remove. Additionally, weak acid cation exchange resins are not very efficient in removing sodium ions associated with sodium chloride, while they are effective in removing sodium ions associated with sodium hydroxide. In other words, when the pH of the water being processed falls to essentially 7.0, residual sodium or other alkali metal ions present are not exchanged into the resin to a large degree. As the result of this, the ion exchange capacity of the weak acid exchange resin used in this invention is spared, to increase the amount of water which can be processed in an ion exchange unit in accordance with this invention. Traces of sodium neutralized with chloride can be tolerated in many industrial water uses as long as the pH is very close to neutral.

As an additional advantage, the use of a small particle size for the weak acid exchange resin in this invention provides a significant increase to the capacity of ion exchange units used herein, when compared with the typical particle size of commercially available weak acid cation exchange resins. For example, weal acid cation exchange resin beads sold by Rohm & Haas typically exhibit a particle size of 16 to 50 mesh, which is much larger than the particle size contemplated fr use here.

Weak acid cation exchange resins are well known to the art and sold by several companies, for example Rohm & Haas, as stated above. These materials typically carry pendant carboxylic acid groups which are covalently bonded to a matrix polymer, typically a well-known plastic material.

The cation exchange resins used herein may be carried in an ion exchange unit which is of conventional design. For example, the powdered weak acid exchange resin herein may be retained on a diatomaceous earth septum, a perforated metal filter, or an orlon sock, for example, any of such systems being of conventional design. The resin may be carried as a layer substantially one-eighth to five-eights of an inch thick on a septum, being held in place by a continuous flow of water pressure in conventional manner. If desired, the resin may be mixed with other ingredients for use, for example one to fifty percent of diatomaceous earth, powdered carbon for sorption of impurities, or a mixture thereof.

Preferably, at least 51 weight percent of the weak acid cation exchange resin used in this invention has a particle size of 40–70 microns.

The "particle size" of the cation exchange resins refers to the largest dimension of each of the particles, as measured for example by microscopic analysis.

Specifically, the unit used for removing residual alkali in accordance with this invention may comprise a housing having a water inlet and a water outlet. A water permeable septum is positioned within the housing to interdict water flow passing between the inlet and the outlet. The septum has an upstream side, and a layer of the weak acid cation exchange resin is carried on the upstream side, the resin having the particle size distribution as described above.

Ion exchange units which are made in that manner exhibit a greatly improved capability to exchange an increased amount of alkali metal ions per kilogram of ion exchange material present, when compared with typical ion exchange units of the prior art. Thus, smaller capacity and less expensive ion exchange units may be used in accordance with this invention for the "polishing" of residual alkalinity of water.

DESCRIPTION OF SPECIFIC EMBODIMENT

Figure 1:
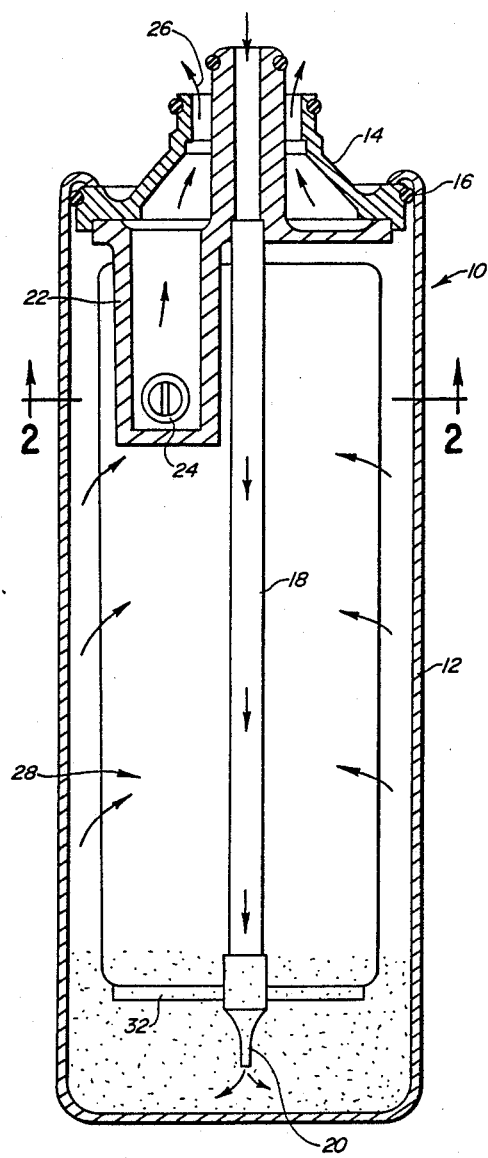
FIG. 1 is a longitudinal sectional view of one embodiment of a unit for removing residual alkali metal ions from water in accordance with this invention.

Referring to the drawings, they show an ion exchange unit for the processing of water, which may be of conventional design, except as otherwise indicated herein. The design specifically shown herein is as shown in the article by P. Regunathan et al, entitled Microbiological Characteristics of Point-of-Use Precoat Carbon Filters, Journal AWWA, October 1987, pp. 67–75. Alternatively, the ion exchange unit of this invention may be manufactured in accordance with the design similar to pre-coated water filters of Everpure, Inc. of Westmont, Ill., or any of the large number of other known designs.

As shown, ion exchange unit 10 defines a housing container 12 defining an open mouth which is sealed by closure 14, carrying sealing ring 16 between container 12 and closure 14. Water inlet pipe 18 passes through closure 14 and terminates at a nozzle 20 near the bottom of container 12. Water outlet member 22 is carried by closure 14 defining an aperture 24 for receiving water and conveying it through closure 14 out of outlet portion 26.

Figure 2:
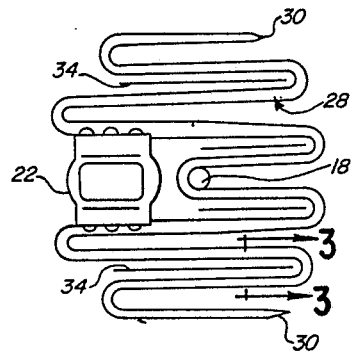
FIG. 2 is a longitudinal sectional view, with the casing omitted, of the interior of the unit of FIG. 1.

A folded septum envelope 28 is provided, of a cross sectional design as shown in FIG. 2, being sealed to container 12 at its ends 30 if desired, with adjacent convolutions of the septum being sealed together at their bottom along lines 32.

Figure 3:
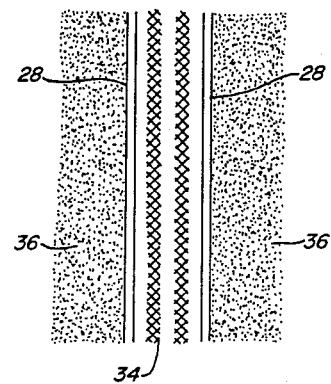
FIG. 3 is a greatly magnified view taken along line 3—3 of FIG. 2.

Typically, lengths of septum 28 may be separated by screening 34 to improve the flow characteristics, as shown in FIG. 3. As also shown in FIG. 3, septum 28 carries a layer of powdered weak acid cation exchange resin 36, the layer being substantially a quarter to one-half inch thick, and retained on septum 28 at least in part by the action of constant water pressure against the layer on the water inlet side.

In accordance with this invention, the particulate material 36 consists predominantly of a weak acid cation exchange resin such as the Rohm & Haas material, having a particle size of 40–70 microns. The purchased beads of ion exchange material may be ground to the desired particle size. A minor amount, less than half, of the material can be comprised of diatomaceous earth, if desired, to improve the flow characteristics through layer 36.

If desired, layer 36 may be incorporated into a closed, water permeable wrapper such as a cellulose-based film, and irradiated with x-rays or gamma rays to form a sterile material for use in the treatment of sterile water.

The ion exchange unit 10 of this invention exhibits the capability to exchange increased amounts of alkali metal ion for its size, when compared to prior art systems, so that a relatively small unit in accordance with this invention may be used to "polish" large quantities of water downstream from a 2-bed strong base demineralizer system of larger size.

The above has been offered for illustrative purposes only, and it is not intended to limit the scope of the invention of this application, which is as defined in the claims below.

That which is claimed is:

1. The method which comprises:
passing water through a strong base demineralizer unit, and thereafter removing residual alkali metal ions from said water by passing said water through a housing having a water inlet and a water outlet, and a water-permeable septum positioned within said housing to interdict water flow therein between the inlet and outlet, said septum having an upstream side, and a layer of weak acid cation exchange resin carried on said upstream side having a particle size distribution in which at least 90 weight per cent of said resin has a particle size of at least 15 microns and at least 90 weight per cent of said resin has a particle size of no more than 150 microns.

2. The method of claim 1 in which at least 51 weight percent of said resin has a particle size of 40 to 70 microns.

3. The method of claim 1 in which said resin carries pendant carboxylic acid ion exchange groups.

4. The method of claim 1 in which said resin is carried as a layer substantially ¼ to ⅜ inch in thickness on said septum.

5. The method of claim 1 in which said resin is mixed with 1 to 50 weight percent diatomaceous earth, powdered carbon, or a mixture thereof.

6. The method which comprises:
passing water through a strong base demineralizer unit, and thereafter passing said water through a weak acid cation exchange resin which carries pendant carboxylic acid ion exchange groups and which is carried as a layer substantially ¼ to ⅜ inch in thickness on a septum, said resin resin having a particle size distribution in which at least 90 weight percent of said resin has a particle size of at least 15 microns and at least 90 weight per cent of said resin has a particle size of no more than 150 microns, whereby said weak acid cation exchange resin can effectively remove residual alkali metal ions remaining in said water which is passed through the strong based demineralizer unit with the quantity of weak acid cation exchange resin present being greatly less than the quantity of resin in said strong base demineralizer unit.

7. The metod of claim 6 in which at least 51 weight percent of said resin has a particle size of 40–70 microns.

8. The method of claim 6 in which said resin is mixed with 1–50 weight percent of diatomaceous earth, powdered carbon, or a mixture thereof.

* * * * *